No. 669,905. Patented Mar. 12, 1901.
P. A. STERNE.
APPARATUS FOR SHAPING AND CUTTING CANDY.
(Application filed Dec. 20, 1900.)
(No Model.) 2 Sheets—Sheet 1.
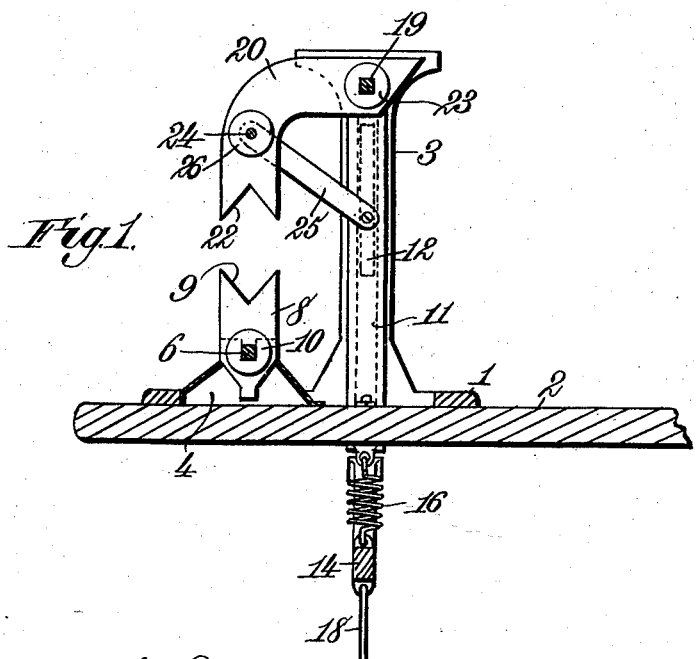
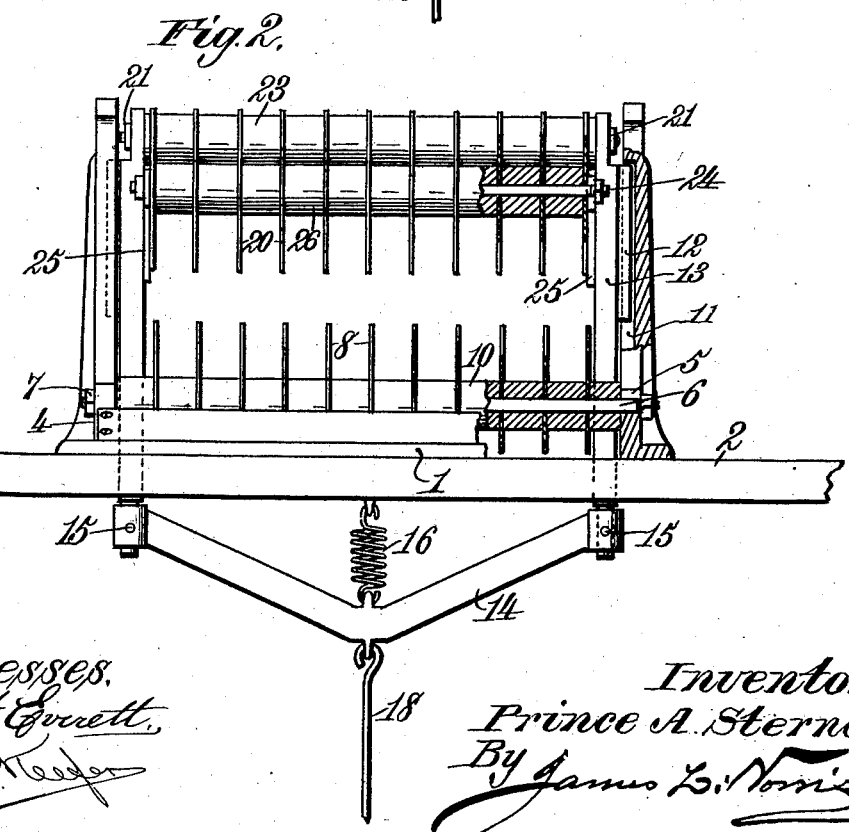
Witnesses.
Robert Everett,
H. B. Keefer
Inventor.
Prince A. Sterne.
By James L. Norris,
Atty.
THE NORRIS PETERS CO., PHOTO-LITHO., WASHINGTON, D. C.

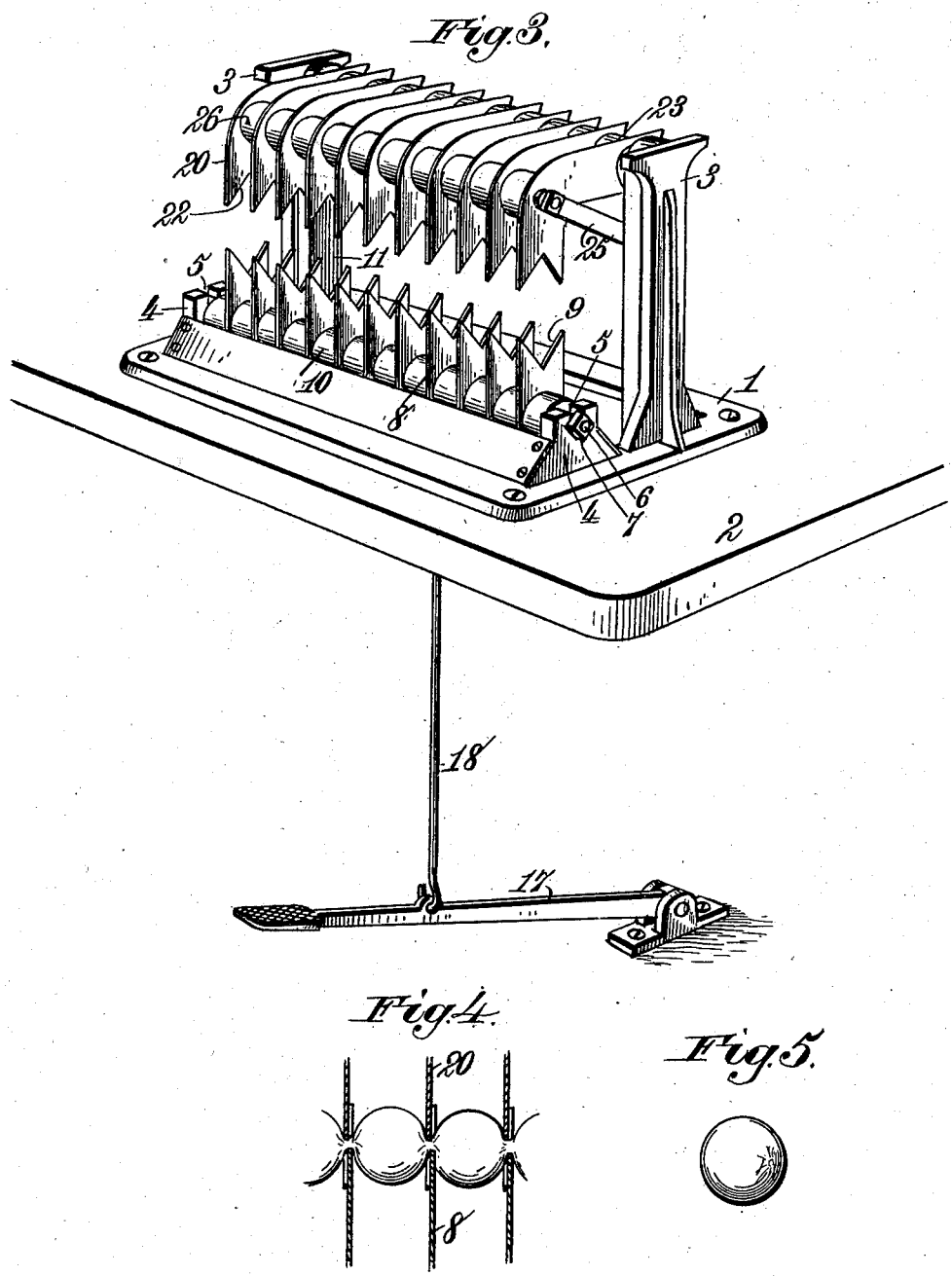

UNITED STATES PATENT OFFICE.

PRINCE ALBERT STERNE, OF NORFOLK, VIRGINIA, ASSIGNOR OF ONE-HALF TO EDWIN T. WADE AND B. R. JONES & COMPANY, OF SAME PLACE, AND P. H. LARKIN, OF PORTSMOUTH, VIRGINIA.

APPARATUS FOR SHAPING AND CUTTING CANDY.

SPECIFICATION forming part of Letters Patent No. 669,905, dated March 12, 1901.

Application filed December 20, 1900. Serial No. 40,527. (No model.)

*To all whom it may concern:*

Be it known that I, PRINCE ALBERT STERNE, a citizen of the United States, residing at Norfolk, in the county of Norfolk and State of Virginia, have invented new and useful Improvements in Apparatus for Shaping and Cutting Candy, of which the following is a specification.

My invention relates to apparatus for shaping and cutting plastic material, such as candy or the like, one object of the same being to provide means whereby an elongated strip of candy or other plastic material may be cut up into sections and shaped in spherical form.

A further object of the invention is to provide means whereby the machine may be adjusted so as to cut and shape the spherical sections of different diameters.

Other objects and advantages of the invention will hereinafter appear, and the novel features thereof will be set forth in the claims.

In the drawings forming a part of this specification, Figure 1 is a side elevation of my improved apparatus, partly in section. Fig. 2 is a front elevation of the same, partly in section. Fig. 3 is a perspective view. Fig. 4 is a detail sectional view of a plurality of the shaping knives or cutters, and Fig. 5 is a detail view of one of the spherical sections produced by the apparatus.

Like reference-numerals indicate like parts in the different views.

The base 1 of my machine is mounted upon a suitable table or support 2 and has the vertical uprights or standards 3 at opposite ends thereof. Said base is also provided at opposite ends in front of the uprights 3 with lugs 4, having notches or recesses 5 therein and constituting bearings or supports for a horizontally-disposed rod or shaft 6, the ends of which are screw-threaded to receive the clamping-nuts 7. Embracing the rod or shaft 6 and secured thereto are the stationary upwardly-extending shaping and cutting knives 8, arranged parallel to each other and provided with V-shaped notches 9 in their upper ends. These knives or cutters 8 are separated from each other by the spacing-blocks 10, which fit upon the rod or shaft 6, and said spacing-blocks are locked against movement on the rod or shaft 6 by means of the clamping-nuts 7, which engage the outer surface of the lugs 4. The edges of the notches 9 are blunt or rounded for a purpose which will hereinafter appear.

On the inner surfaces of the uprights or standards 3 are formed vertically-disposed parallel grooves 11, in which fit and are adapted to move the ribs 12 on the vertically-disposed bars 13, which extend down through openings in the table or support 2 and are connected together at their lower projecting ends by means of the curved cross-bar 14. The said cross-bar 14 is attached to the vertically-movable bars 13 by means of removable pins 15, by which construction said bar 14 may be disconnected from the bars 13. A spring 16, secured to the cross-bar 14 and to the under side of the table or support 2, tends to hold said cross-bar and the parts connected thereto normally in their raised positions. The said cross-bar 14 and the parts to which it is attached may be depressed, however, by means of a foot-lever 17, connected through the link or pitman 18 with said cross-bar. Connecting the upper ends of the bars 13 is a horizontally-disposed rod or shaft 19, on which are mounted the shaping knives or cutters 20, the outer ends of said shaft 19 being screw-threaded to receive the clamping-nuts 21. Each of the knives or cutters 20 projects outwardly from the shaft 19 and is curved downwardly and formed with inverted-V-shaped notches 22 in its lower end, as clearly shown. The said knives or cutters 20 are arranged in parallel relation to each other and are separated from each other on the shaft 19 by means of the spacing-blocks 23, similar to the spacing-blocks 10, heretofore described. Extending through the outer ends of the knives or cutters 20 is a rod or shaft 24, whose ends are attached, by means of the braces 25, to the vertically-disposed rods 13. In this way the knives or cutters 20 are firmly braced at all points and prevented from displacement on the shaft 19. Spacing-blocks 26, similar to the blocks 10 and 23, heretofore referred to, are located on the shaft 24 between the knives or cutters 20. The knives 20 are the same distance apart as the knives 8, and the inverted-V-shaped notches 22 therein, which are provided with the blunt or rounded edges, coöperate with the notched upper ends 9 of the knives or cutters 8. Each of the knives 20, however, is located slightly out of line with the knife or cutter 8 with which it coöperates, so that during the downward movement of the knives 20 the same will be permitted to pass by the knives 8, as illustrated in Fig. 4 of the drawings.

In using my improved device an elongated mass of candy in a plastic condition is placed upon the upper ends of the knives 8, resting within the notches 9 of said knives. The foot-lever 17 is then depressed, which action, through the pitman 18 and cross-bar 14, draws down the vertically-movable bars 13 against the action of the spring 16. As the shafts 19 and 24, with which the cutters 20 are connected, are also connected to the bars 13, the depression of said bars 13 will cause a similar downward movement to be imparted to all of the knives 20. The notched ends 22 of said knives are thereby brought in contact with the upper surface of the mass of plastic candy and, coöperating with the notched upper ends 9 of the knives or cutters 8, draw the candy around into spherical form, as illustrated in Fig. 4 of the drawings. As the notches 9 and 22 of the knives 8 and 20, respectively, are oppositely disposed, the blunt or rounded edges thereof will engage all sides of the elongated mass of candy, and with the gradually-decreasing size of the spaces between the notches 9 and 22, due to the continued downward movement of the knives 20, the candy will be continuously drawn around or shaped into spherical form and finally severed into spherical sections, when the spaces between the notches 9 and 22 are completely closed. When the cutting up of the mass into sections has taken place, the foot is removed from the lever 17 and the knives 20 return to their normal raised positions through the action of the spring 16.

If it be desired to remove the table 2 and the machine which is mounted thereon away from the foot-lever 17, it is merely necessary to remove the pins 15 from the ends of the cross-bar 14 and disconnect said cross-bar from the vertically-movable bars 13.

The spacing-blocks 10, 23, and 26 are all of the same length. If it be desired, however, to produce spherical candy-sections of larger or smaller diameter, it is merely necessary to loosen the clamping-nuts on the ends of the shafts 6, 19, and 24, remove the knives or cutters 8 and 20 and the blocks 10, 23, and 26 from said shafts, and replace said cutters on their respective shafts with interposed spacing-blocks of greater or less length. In this way the distance between the shaping knives or cutters may be varied and spherical candy-sections of different diameters produced.

Having thus fully described my invention, what I claim as new, and desire to secure by Letters Patent, is—

1. In an apparatus for shaping and cutting candy and other plastic materials, two sets of coöperating knives or cutters having V-shaped engaging ends.

2. In an apparatus for shaping and cutting candy and other plastic materials, two sets of coöperating knives or cutters having V-shaped engaging ends, provided with blunt or dull edges.

3. In an apparatus for shaping and cutting candy and other plastic materials, a series of stationary shaping and cutting knives having V-shaped engaging ends and arranged parallel to each other with their engaging ends uppermost, and a series of movable shaping and cutting knives arranged parallel to each other above said stationary knives and having inverted-V-shaped engaging ends, the upper set of said knives located in planes parallel to the lower set and adapted to coöperate therewith.

4. In an apparatus for shaping and cutting candy and other plastic materials, a series of stationary shaping and cutting knives having V-shaped engaging ends and arranged parallel to each other with their engaging ends uppermost, a series of movable shaping and cutting knives arranged parallel to each other above said stationary knives and having inverted-V-shaped engaging ends, the upper set of said knives located in planes parallel to the lower set and adapted to coöperate therewith, a foot-lever for depressing the series of movable knives, and a spring for returning the same to their normal raised position.

5. In an apparatus for shaping and cutting candy and other plastic materials, the combination with a base and a pair of uprights or standards thereon having vertically-disposed grooves therein, of a series of stationary shaping and cutting knives secured to said base, arranged in parallel relation to each other, spaced apart and having their upper ends provided with V-shaped notches, a pair of vertically-disposed parallel bars having ribs thereon which fit and are adapted to move within the grooves in said uprights, a rod or shaft connecting the bars at their upper ends, a series of shaping and cutting knives secured to said shaft, projecting outwardly and downwardly therefrom, having inverted-V-shaped notches in their lower ends, spaced apart and arranged in paralell relation to each other, the upper set of knives adapted to coöperate with the lower stationary set, and means for reciprocating said vertically-disposed bars and the knives connected thereto.

6. In an apparatus for shaping and cutting candy and other plastic materials, the combination with a base, of a removable rod or shaft mounted therein, a series of stationary shaping and cutting knives on said shaft having V-shaped upper ends, spacing-blocks removably mounted on said shaft, means for clamping said knives and said blocks to said shaft, and a series of movable knives having inverted-V-shaped lower ends, said movable knives being located above said stationary knives and adapted to coöperate therewith.

7. In an apparatus for shaping and cutting candy and other plastic materials, the combination with a base-plate having uprights or standards thereon provided with vertically-disposed grooves and having lugs thereon provided with sockets, of a rod or shaft mounted in the sockets in said lugs, upwardly-extending stationary shaping and cutting knives having V-shaped notches in their upper ends arranged in parallel relation to each other and spaced apart, two vertically-disposed bars projecting downwardly beneath said base and having ribs thereon which fit and move within said grooves, a cross-bar connecting the lower ends of said vertical bar, a spring attached to said cross-bar and to a stationary part for holding said cross-bar and the parts connected therewith in their raised positions, a foot-lever, a pitman connecting said foot-lever with said cross-bar, a rod or shaft connecting the upper ends of said vertically-disposed bars, outwardly and downwardly extending shaping and cutting knives secured to the latter shaft, arranged in parallel relation to each other, spaced apart and having inverted, V-shaped notches in their lower ends, a rod or shaft connecting the upper series of knives intermediate their ends, and braces connecting the latter shaft with said vertically-disposed bars.

In testimony whereof I have hereunto set my hand in presence of two subscribing witnesses.

PRINCE ALBERT STERNE.

Witnesses:
EDWIN T. WADE,
WM. M. STOCKBRIDGE.